(12) United States Patent
Borrego Vicaria

(10) Patent No.: US 11,938,529 B2
(45) Date of Patent: Mar. 26, 2024

(54) MACHINE FOR REPAIRING MOTORCYCLE RIMS

(71) Applicant: LLANTACARS, S.L., Malaga (ES)

(72) Inventor: Miguel Borrego Vicaria, Malaga (ES)

(73) Assignee: LLANTACARS, S.L., Malaga (ES)

( * ) Notice: Subject to any disclaimer, the term of this patent is extended or adjusted under 35 U.S.C. 154(b) by 0 days.

(21) Appl. No.: 18/015,072

(22) PCT Filed: Jun. 14, 2021

(86) PCT No.: PCT/ES2021/070435
§ 371 (c)(1),
(2) Date: Jan. 8, 2023

(87) PCT Pub. No.: WO2022/008769
PCT Pub. Date: Jan. 13, 2022

(65) Prior Publication Data
US 2023/0330732 A1      Oct. 19, 2023

(30) Foreign Application Priority Data

Jul. 9, 2020 (ES) ............................... ES202030705

(51) Int. Cl.
*B21D 1/10* (2006.01)
*B21D 53/30* (2006.01)

(52) U.S. Cl.
CPC ............... *B21D 1/10* (2013.01); *B21D 53/30* (2013.01)

(58) Field of Classification Search
CPC ............. B21D 1/06; B21D 1/10; B21D 53/30
See application file for complete search history.

(56) References Cited

U.S. PATENT DOCUMENTS 2,489,815 A    11/1949   Rader

FOREIGN PATENT DOCUMENTS

| BR | 0305007 A | 5/2005 |
| BR | MU8801119 U2 | 10/2009 |
| ES | 2216670 A1 | 10/2004 |
| RU | 78259 U1 | 11/2008 |

OTHER PUBLICATIONS

International Search Report for related patent application PCT/ES2021/070435 prepared by the European Patent Office dated Oct. 14, 2021, translation provided.
Written Opinion of the International Searching Authority for related patent application PCT/ES2021/070435 prepared by the European Patent Office dated Oct. 14, 2021, translation provided.

*Primary Examiner* — Teresa M Ekiert
(74) *Attorney, Agent, or Firm* — Hassan Abbas Shakir; Shakir Law PLLC

(57) ABSTRACT

A machine for repairing motorcycle rims includes a frame, straightening devices having actuators for straightening deformations of the rim displaceable by the frame, a vertical support shaft adjustable with respect to the frame structure, configured to support the rim. The machine also includes a head base coupleable to an intermediate bedplate of the frame, a head rotatably coupleable to the head base, configured to rotate freely or actuated by transmission means, locking units adjacent to the head, configured to lock the rotation of the head, a fastening device coupleable to the head, configured to, in combination with the vertical support shaft, fasten the rim crossing through and/or resting on a hub of the rim; and a machining device mounted in a movable manner in the frame, configured to machine the rim.

16 Claims, 13 Drawing Sheets

MACHINE FOR REPAIRING MOTORCYCLE RIMS

CROSS-REFERENCE TO RELATED APPLICATIONS

This application is a national stage under 35 U.S.C. § 371 of PCT patent application PCT/ES2021/070435 filed on 14 Jun. 2021, which is pending and which is hereby incorporated by reference in its entirety for all purposes. PCT/ES2021/070435 claims priority to Spanish Patent Application P202030705 filed on 9 Jul. 2020, which is hereby incorporated by reference in its entirety for all purposes.

TECHNICAL FIELD OF THE INVENTION

The present invention is related to machines and methods for repairing vehicle rims, particularly it is related to machines and methods for the comprehensive repair of motorcycle rims, wherein the configuration of the central hub of these types of rims requires a different coupling to that of conventional automobile rims or similar, which are fastened by means of several bolts to the axle of the vehicle.

STATE OF THE ART

Several machines for repairing vehicle rims, in particular car rims, have been disclosed in the state of the art. It is known that car rims are fastened to the axle of the car by bolts, generally four bolts, which cross through holes arranged in the central hub of the rim. Therefore, in order to fasten said rim in a machine for the repair thereof, the coupling must be similar to that of the rim in the car.

These solutions for fastening the car rim to the repair machine are widely known in the market.

Moreover, with respect to motorcycle rims, it is known that, in a typical configuration of a rim forged from one piece, it comprises a central hub in the inner part of which two bearings are arranged spaced from each other and axially aligned in order to be crossed through by an axle on which they rotate. Such that, in order to repair a motorcycle rim of this type and guarantee the concentricity thereof with respect to the axis of rotation once repaired, the ideal would be for the fastening of the rim to be similar or identical to how it is fastened in the frame of the motorcycle.

With respect to machines for repairing motorcycle rims, the Brazilian utility model MU 8801119-4 and patent PI 0305007-6A, also from Brazil, have been disclosed in the state of the art.

In the aforementioned utility model, a machine for straightening metal spoked motorcycle rims is disclosed, wherein it is not clear how said rim is fastened in the machine in order to then rotate it, straightening it through a series of rollers, such that when a deformed part of the rim passes through such rollers it is straightened. This utility model does not disclose the fastening or coupling of the rim to the machine and, furthermore, the straightening process is carried out with rollers, which can be limiting for the comprehensive repair of the rim.

Moreover, Brazilian patent PI 0305007-6, like the referenced utility model, discloses a machine for repairing radial motorcycle rims wherein the fastening of the rim is carried out by two threaded horizontal metal shafts, each arranged in vertical columns of the structure of the machine, being actuatable by cranks arranged at the outer ends of said threaded metal shafts. The opposite ends of the shafts, in other words, the end of each shaft which is oriented towards the inside of the machine, due to the actuation of the cranks, are brought closer together, such that they press on the hub of the wheel, each end resting on each of the bearings arranged in the hub, without crossing through them. Furthermore, as described in this patent document, the bent portion of the rim is arranged between a pair of clamps installed in the structure, such that the vertical unbending is produced with the manual activation of a hydraulic jack provided in the lower part of the structure and which pulls on the damaged portion of the rim, stretching this area, performing the unbending; while the horizontal unbending is performed by means of lower horizontal cranks which, in the same manner, support and adjust the damaged area.

From this Brazilian patent it can be seen that the fastening of the compression rim on the bearings of the hub could affect the structure of said hub, furthermore, since the bearings do not cross through, the concentricity of the rim cannot be guaranteed once it is repaired. It can also be seen that the unbending of the affected part of the rim is limited to the shape and fastening of the clamps, for which reason the comprehensive repair of the rim cannot be addressed.

It is important to note that the machines disclosed in the cited Brazilian documents are not intended to repair motorcycle rims made of light alloys, forged from a single piece, being therefore limited to radial rims made of steel.

Therefore, the need to provide a machine, system and/or method by means of which the comprehensive repair of a motorcycle rim is possible, including the unbending and/or machining thereof, wherein the fastening of said rim is carried out as it is fastened in the motorcycle itself in order to ensure the concentricity of the rim with respect to the axis of rotation thereof once it has been repaired.

DESCRIPTION

In order to solve the need found, the present invention provides a machine for repairing motorcycle rims of all kinds which comprises a rigid frame formed by two vertical columns joined by an intermediate bedplate and an upper crossbar. In the intermediate bedplate, a head base is coupled to which a head is rotatably installed which is in turn configured to rotate with respect to a main axis freely or by the action of transmission means suitably connected thereto. Locking means configured to lock the rotation of the head are also arranged in the intermediate bedplate.

The structural formation of the head, which will be detailed in later sections, enables it to rotate smoothly, while giving it a high resistance to lateral tensile and/or vertical thrust forces generated thereon by the different actuators had by the machine for straightening the rim.

It is important to note that the motorcycle rims for which the machine of the present invention is designed are preferably rims forged from a single piece of an alloyed material, for example, high-strength light aluminium alloy. In some models of these rims, the central hub, or simply hub, is formed such that two bearings are installed therein spaced axially with respect to an axis of rotation of the rim such that, when mounted in the motorcycle, the inner ring of the bearings is crossed through by an axle which adjusts to said rings, such that the wheel rotates with respect to the axle due to the bearings. In another embodiment of the rim, the hub is intended to be coupled to an axle of the motorcycle through bolts, similar to how car rims are coupled.

Given the different modalities of the rims, one of the main objectives of the machine of the present invention is to achieve the coupling in the machine of any model of rim by emulating the coupling of said rim in the machine as it would be in the chassis of the motorcycle, such that the concentricity of the rim with respect to the axis of rotation thereof is guaranteed after it is repaired.

Therefore, for the mounting and repair of a rim in the machine, the head is locked by the locking means and a fastening tool configured to pass through the hub of the rim is coupled thereto. Once said tool has been coupled, the rim is located in a horizontal position, the hub being crossed through and coupled by the tool. The tool is then coupled to a vertical support shaft displaceable by the upper crossbar of the frame. With this coupling, it is possible to make the rim rotate with respect to the axis of rotation thereof which, as the person with skill in the art will be able to appreciate, coincides with a main axis of rotation with respect to which the head rotates. In this manner, the rim rotates just as if it were placed in the motorcycle, for which reason it is possible to more easily appreciate the deformations of the rim with measuring devices provided in the machine.

This type of fastening of the hub makes it possible to better apply the tensile forces in the affected portions of the machine which are going to be unbent.

Depending on the size of the hub and/or the bearings installed in said hub, it may be necessary to use an adapter coupleable to the tool, this adapter being configured to fit into the hub and/or into the bearing. Two similar adapters are usually used, one on each side of the hub, in order to give the rim stability in the repair.

An operator can work seated in front of the machine on a stool with a suitable height so that, when proceeding to observe and detect the deformations of the rim, the point of view is at the height of the devices for measuring the deformations of the rims, causing the operator to work in the most ergonomic manner possible.

The measuring devices of the machine can be installed on one side of the head, for example, to the left of the head when looking at the machine from the front and the actuators with the energy distribution systems thereof on the opposite side, in other words, the right side of the head, which facilitates the use of the machine.

In order to detect defects and proceed to repairing the rim, it is preferably rotated anti-clockwise, if viewed from above the machine, and since the devices for measuring the deformations are installed in the left side, when the rim rotates the operator can see over said devices for measuring the deformations of the rim without visual fatigue.

Moreover, the machine has straightening devices configured to, as the name indicates, straighten the rim, these straightening devices being a combination between actuators and tools especially adapted to address the different deformations of the rim and remove them. As part of these straightening devices, in one of the vertical columns of the frame, for example, in the right vertical column, a first actuator vertically displaceable by said vertical column, and lockable in the position thereof when it is located in the work point, has been arranged. This first actuator includes adjustment means configured to adjust the stroke and/or displacement with respect to itself of the first actuator in order to be adjusted to the size and/or diameter of the rim and, consequently, that the tools installable in said first actuator can better perform the work thereof.

Likewise, a second actuator for vertical ascending/descending thrust is coupleable to the upper crossbar of the frame of the machine, this second actuator being displaceable in the upper crossbar. Said second actuator is likewise displaceable in a direction essentially normal to the upper crossbar such that it can be suitably adjusted to the size of the rim to be repaired.

The intermediate bedplate comprises a lower portion by which a third actuator for vertical ascending thrust is displaceable which is used as support in the processes for repairing the deformations of the rim.

Moreover, a guide block is incorporated into the upper crossbar by which the vertical support shaft is displaceable in the vertical direction. At one end, this vertical support shaft comprises a housing configured to rotatably couple the fastening tool. Such that, when lowering said vertical support shaft, the tool is coupled to it, in order to give this the tool sufficient structural strength when the actuators apply forces in order to remove the deformations in the repair of the rim. In this manner, the tool does not undergo any damage and the rim is repaired with respect to the axis of rotation thereof.

Repair tools with different configurations and shapes are coupleable to the first, second and third actuators in order to address the different deformations which can be had in the rim. Likewise, the application of the actuators can be done individually or conjointly on the rim, such that, in combination with the repair tools, all the deformations of the rim are removed.

Once the rim has been straightened and centred, and according to the repair needs, the rim can proceed to be machined, for which the fastening device comprises a gripping plate which replaces the fastening tool in the head and a tool is installed, especially prepared to fasten the rim during the machining, in the vertical support shaft. This tool is axially adjustable in the vertical support shaft, in order to fasten the rim by pressure and lock it with the hub.

The rim is placed between the gripping plate and the tool, resting on one side of the hub in an adapter coupleable to the gripping plate, said adapter being configured to fit in the bushing and/or in the bearing, and the tool is coupled in the opposite part of the hub of the rim, lowering the vertical support shaft and axially adjusting said tool in the vertical support shaft in order to couple the hub of the rim, pressing it against the gripping plate.

Having coupled the rim in this manner in the machine, the head is made to rotate by transmission means which, consequently, make the rim rotate in order to proceed to the machining thereof by a machining device which is coupleable and displaceable by the vertical column of the frame.

The machining device comprises a mast to which a tool-carrying carriage is coupleable which is configured to move with respect to said mast and to carry a cutting tool which, in turn, is configured to remove material from the rim by the relative movement between said cutting tool and the rim.

The machining of the rim is performed by an operator sitting on a stool at the rear right part of the machine wherein it has the electrical systematisation, lighting systems, transparent plastic protectors installed to protect the operator during their work from any particles given off by the machine, as well as safety goggles and a safety stop.

When the machining begins, the operator positions the cutting tool at the height of the part of the rim to be machined and, with the displacement of the tool-carrying carriage, a high-quality machining is achieved, since, like the straightening and centring of the rim is carried out with high precision, in the machining the rim barely loses two to three tenths of a millimetre, thus complying with the safety regulations.

As mentioned above, the machine is equipped with special straightening tools for correcting any deformation or damage undergone by the rims, as well as spanners with an adjustable position for different types of rims, special spanners for straightening the edges of the rims, as well as different tools and complements.

Additionally, the machine can incorporate special tools for straightening and centring the brake discs of the motorcycles, as well as devices for measuring the deformations, achieving a perfect and comprehensive repair of the rims.

In other alternative embodiments of the invention, wherein the rim to be repaired comprises a central hub which is coupled to a rotating axle of the motorcycle by means of bolts, the device for fastening the machine comprises a tool coupleable to the head by a fastening element which is introduced into a hole of the tool and which is coupled in the head, wherein this tool comprises a coupling end wherein threaded fastening means are provided. Preferably, the threaded connection means comprise threaded holes suitably distributed in the coupling end such that, in order to couple the rim to the tool, holes arranged in the hub are crossed through by threaded fasteners which are coupled in the threaded holes, fastening the rim to the tool for the straightening and/or machining thereof. Alternatively, threaded bolts suitably distributed at the coupling end are configured to cross through the holes in the hub, said hub being fastened to the tool by nuts which are coupled to the threaded bolts.

In another embodiment of the invention, wherein the rim has a large width, for example, of motorcycles with very high engine displacement, the fastening device comprises a tool coupleable to the head by means of a fastening element, wherein a drag pin is intended to be coupled in a connecting area of the tool, in order to move the rim coupled to the tool by dragging. An intermediate bushing coaxially coupleable to the tool or to the head, and/or an end bushing coupleable to the intermediate bushing, to the tool or to the head, are part of this type of fastening device, these bushings being coupled to each other in order to adapt to the width of the rim, fastening the hub, on one side, and, on the other side, fastening it with the compression tool.

As mentioned in previous lines, the main advantage of the machine for repairing rims of the invention is to couple the rim, regardless of the configuration of the central hub thereof, in a similar manner to how it is coupled to the motorcycle in order to guarantee the concentricity thereof with respect to the axis of rotation thereof after it is repaired.

BRIEF DESCRIPTION OF THE FIGURES

The foregoing and other advantages and features will be more fully understood from the following detailed description of exemplary embodiments with reference to the accompanying drawings, which should be considered by way of illustration and not limitation, wherein.

DETAILED DESCRIPTION OF AN EXEMPLARY EMBODIMENT

In the following detailed description, numerous specific details are set forth in the form of examples to provide a thorough understanding of the relevant teachings. However, it will be apparent to those skilled in the art that the present teachings can be implemented without such details.

The present invention provides a machine for repairing motorcycle rims, these rims being mainly of the type forged from a single piece of light alloy material, such as, for example, high-strength aluminium, wherein the rim comprises a central hub, henceforth hub, intended to be rotatably coupled in the chassis of the motorcycle. Depending on the fastening of the rim to the motorcycle, the hub is provided with a pair of parallel bearings axially spaced with respect to the axis of rotation of the rim, in the front ring of which a through axle is adjusted which is coupled to the chassis. In this manner the rim can rotate with respect to the axle by the bearings, this hub configuration being the most widely used in motorcycles. In an alternative configuration, the hub comprises a series of through holes through which bolts are introduced which are coupled in a rotating axle structure arranged in the motorcycle, such that the threaded fasteners or bolts couple the rim to said rotating axle structure.

Figure 1:
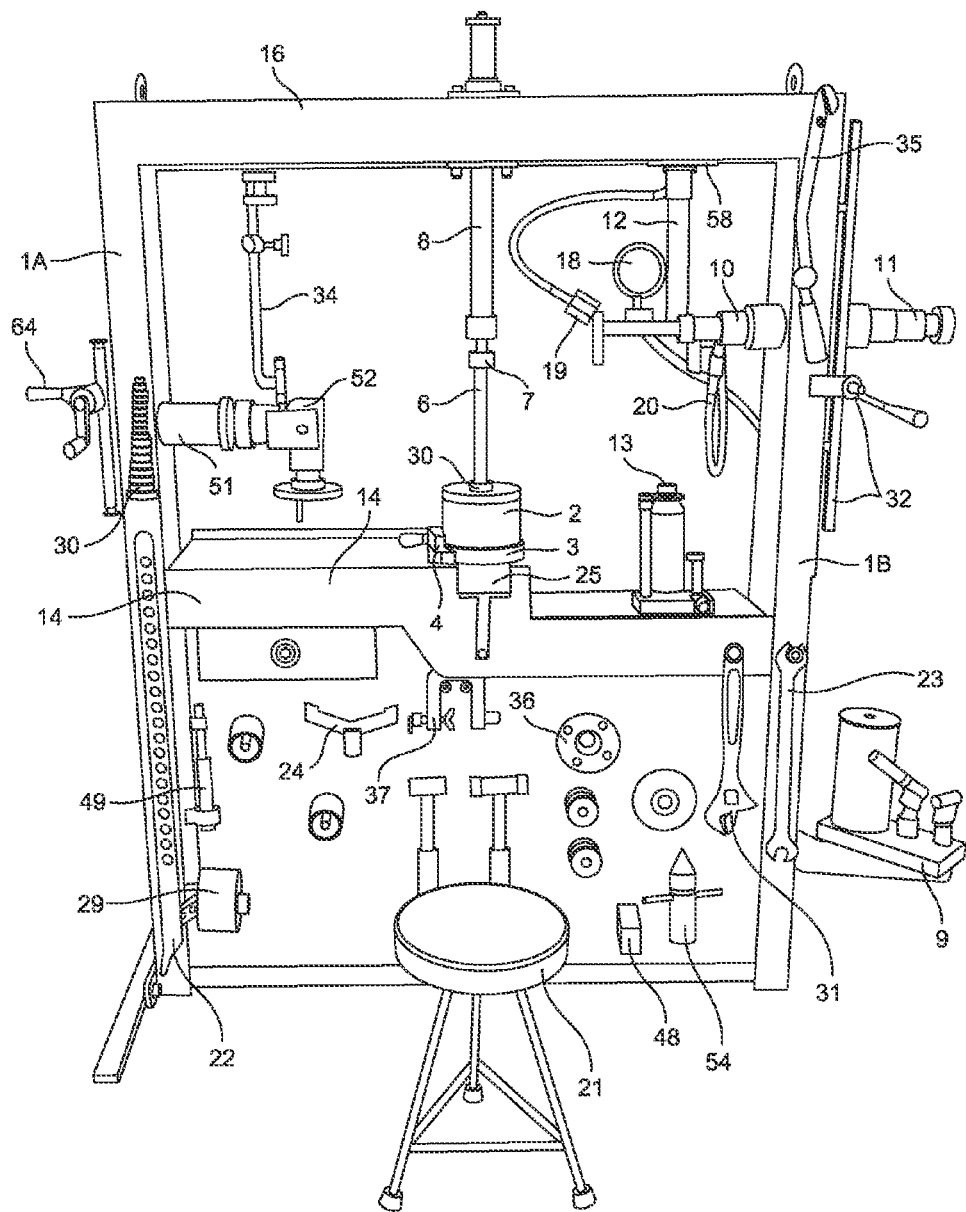
FIG. 1 is a general front view of the machine for repairing motorcycle rims of the invention, wherein it shows a large part of the components thereof and, in particular, a first embodiment of the fastening device.

Taking into account the above, and according to what is seen in FIG. 1, the machine for repairing rims of the invention comprises a frame (1) provided with two vertical columns (1A) (1B) joined through an intermediate bedplate (14) and an upper crossbar (16). In the preferred embodiment, the vertical columns (1A) (1B), the intermediate bedplate (14) and the upper crossbar (16) are formed from high-strength steel plates suitably joined in order to form a rigid and stable frame (1).

The machine is provided with straightening devices which essentially consist of a series of actuators and straightening tools coupleable to said actuators which, in combination, are capable of addressing the different deformations which can occur in a rim in order to straighten and centre it.

Figure 2:
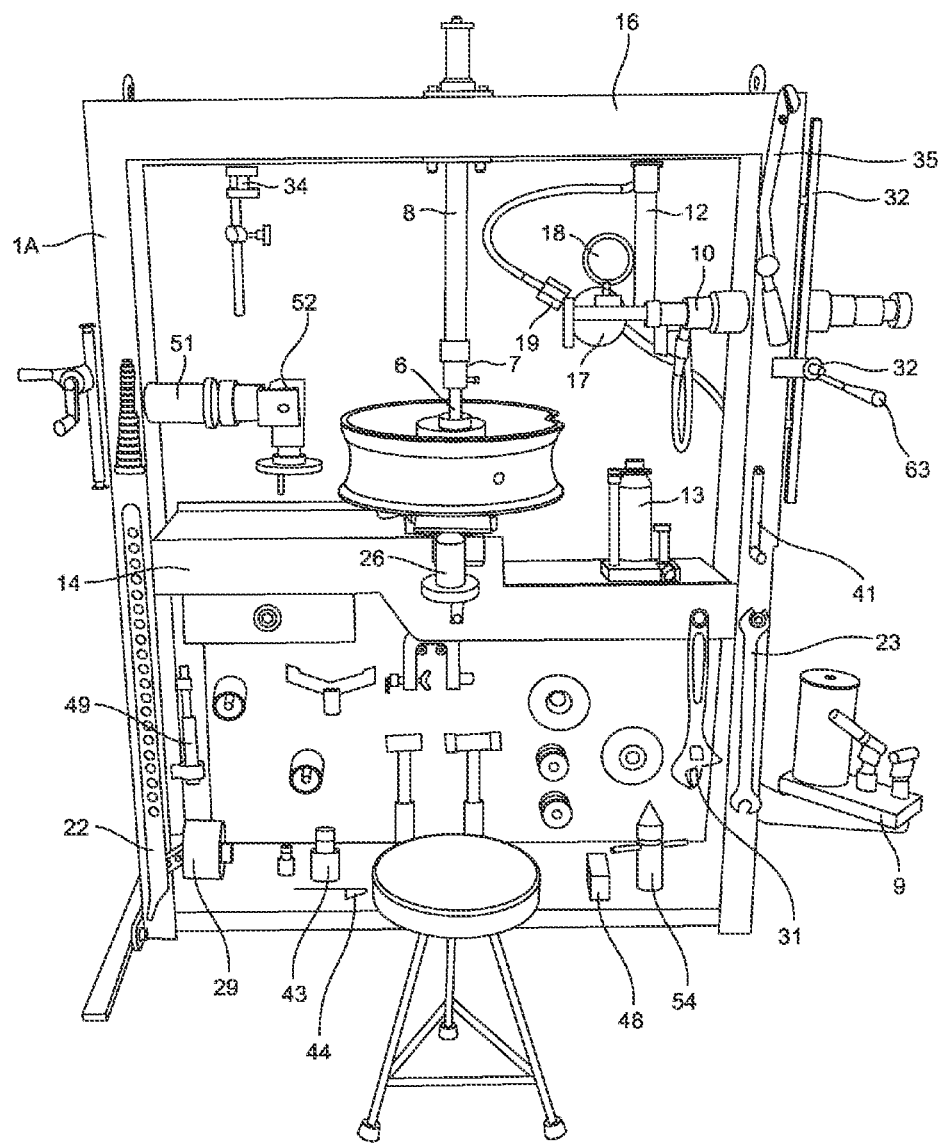
FIG. 2 is a general front view of the machine for repairing motorcycle rims of the invention, wherein it shows a motorcycle rim coupled by the central hub to the machine with the first embodiment of the fastening device.
Figure 3:
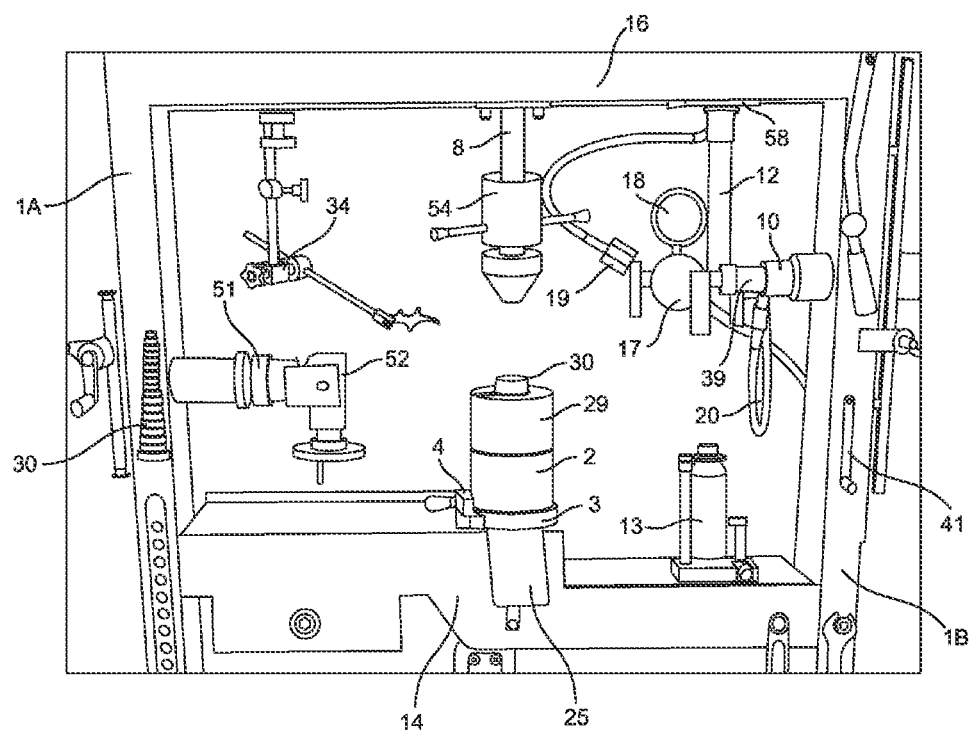
FIG. 3 is a general front view of the machine for repairing motorcycle rims of the invention, wherein it shows a large part of the components thereof and, in particular, a second embodiment of the fastening device.

As seen in FIGS. 1 to 3, in a preferred embodiment, the straightening devices comprise a first actuator (10) displaceable by the vertical column (1B), a second actuator (12) configured to thrust in the descending vertical direction displaceable by the upper crossbar (16) and a third actuator (13) for vertical thrust displaceable in the intermediate bedplate (14).

The first actuator (10) is displaceable by the vertical column (1B) of the frame (1) which, as seen in FIGS. 1 to 3, is the right vertical column, wherein said first actuator (10) is coupleable to a block (10A) movable by the vertical column (1B), by a rack and pinion mechanism (32) actuatable by a crank (63), to which it is conveniently coupled. The block (10A) is configured to be locked when the first actuator (10) is located in the work point.

The first actuator (10) also comprises adjustment means in order to adapt the position of the first actuator (10) depending on the diameter of the rim to be repaired. For example, when the actuator is a piston displaceable in a cylinder, these adjustment means comprise a round nut (11), which adjusts the displacement of the piston with respect to the cylinder in order to place it in the suitable position, according to the diameter of the rim. In this manner, the first actuator (10) with the tools which are coupleable to it is displaceable longitudinally and transversely with respect to the vertical column (1B) in order to adapt to the dimension of the rim to be repaired, and to suitably locate the tools, as observed in FIGS. 11 and 12, for the straightening tools (37) and (39).

Similarly, in order to move the second actuator (12) through the upper crossbar (16) it is possible to have a sliding block (58) (not shown) to which said second actuator (12) is coupleable, wherein the sliding block (58) is lockable in the upper crossbar (16) in order to fasten said second actuator (12) in a specific position. Likewise, the second actuator (12) is movable with respect to the sliding block (58) in a direction which is normal to the upper crossbar (16) in order to better adjust to the dimension of the rim to be repaired and/or the position wherein it must apply the vertical working pressure.

The third actuator (13) is freely displaceable by a lower portion (14A) of the intermediate bedplate (13) in order to be conveniently located in the working position with respect to the rim.

In the preferred embodiment, the actuators (10) (12) (13) are hydraulic actuators which are ideal for exerting high compression loads, such as the one required to straighten a rim. Therefore, the machine comprises all the suitable means for accumulating, controlling and distributing the fluid in order to make the actuators (10) (12) (13) operate properly. However, as the person with skill in the art will recognise, the use of other types of actuators, for example pneumatic or electric actuators, are within the scope of the invention.

As seen in FIGS. 1 and 2, the machine comprises a pressure distributor (17) with opening and closing stopcocks (19), a safety valve, the distributor (17) being fed by a hydraulic pump (9) with two speeds, a faster one for approximation and another for high working pressure. The hydraulic systems are joined with flexible thermostatic high-pressure hoses (20) with the length necessary for each device. The pressure distributor (17) incorporates a pressure manometer (18).

It is important to note that the straightening tools, which will be detailed later, are intended to be coupled to the first (10), second (12) and third (13) actuators.

As seen in FIGS. 1 to 3, the machine comprises a vertical support shaft (8) coupleable to the upper crossbar (16) by a block coupleable in a fixed manner to said upper crossbar (16), wherein the vertical support shaft (8) is vertically displaceable in said block and fastenable in a suitable position, being, therefore, adjustable in height with respect to the upper crossbar (16). This vertical support shaft (8) is configured to support the rim in combination with fastening devices coupleable to the machine, as will be seen later.

Moreover, as seen in FIGS. 1 to 6, the machine for repairing rims of the invention is provided with a head base (3) coupleable to the intermediate bedplate (14), configured to rotatably house a portion of the head (2) which, in turn, is configured to rotate with respect to a main axis freely or actuated by transmission means.

Since, as mentioned, the head (2) is a revolving or rotating body, said rotation is performed with respect to a main axis (instantaneous axis of rotation of the head) which, when the rim is coupled to the head, coincides with the axis of rotation of said rim.

In a preferred embodiment, the head base (3) comprises a flanged end (not shown) by means of which it is fastened to the intermediate bedplate (14) and a cylindrical segment (3A), which projects from the flanged end, which crosses through the intermediate bedplate (14). The head base (3) is provided with a through hole (not shown) and is configured for the rotational coupling of a head rod (2B) of the head (2). Suitable means for enabling the rotation of the head rod (2B) and, therefore, for the free rotation of the head (2), are arranged in the hole of the head base (3), for example, self-lubricating bushings, friction roller bearings and/or, preferably, bearings to which the head rod (2B) is coupled, wherein such bearings can be the type which supports axial, radial or mixed loads.

Figure 5:
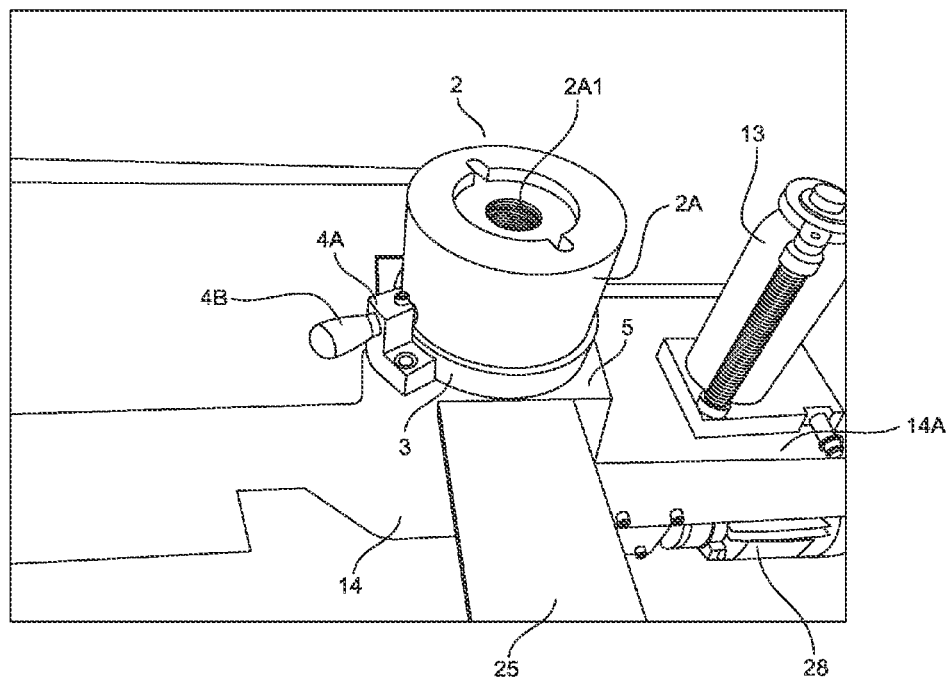
FIG. 5 is a view of a portion of the machine wherein the head and the locking means are mainly seen.
Figure 6:
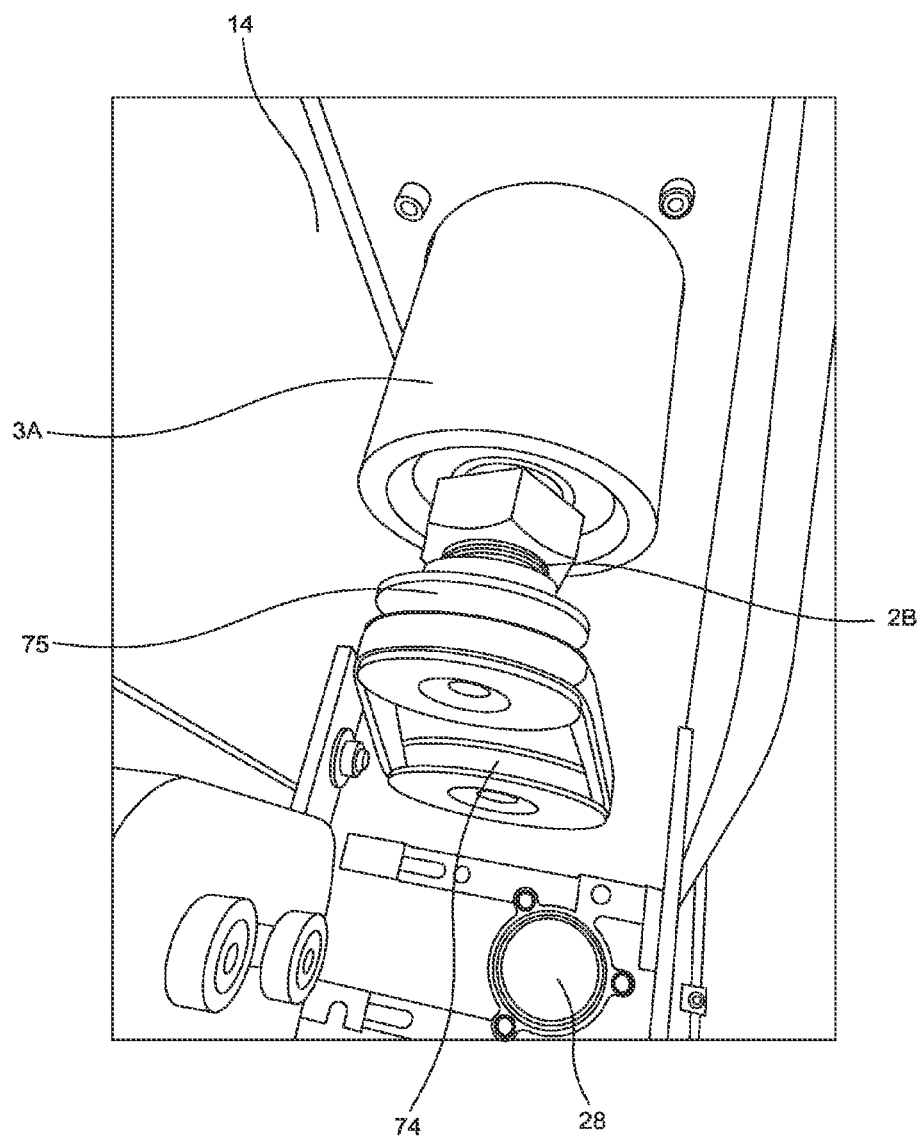
FIG. 6 is a view of a portion of the machine wherein it shows a portion of the base of the head and the transmission means.

Moreover, and as seen in FIG. 5, the head (2) comprises a coupling body (2A) configured for the coupling of different tools which make up part of the fastening devices with which the rim is coupled to the machine, for which, in the coupling body (2A) a hole (2A1) configured for the coupling of the tools is arranged. Preferably, this hole (2A1) is a threaded hole, for threaded fastening of the tools of the fastening device. The head rod (2B) extends coaxially from the coupling body (2A) being introduced, as mentioned, into the hole of the head base (3). One end of the head rod (2B), opposite from the coupling body (2A), protrudes from the cylindrical segment (3A) of the head base (3) and is configured to couple an element for actuating transmission means. As seen in FIG. 6, this actuating element takes the form of a driven pulley (75) which is actuated through a belt which transmits the movement of a drive pulley (74) connected to an output shaft of a motor reducer (28) installable in the intermediate bedplate (14). The motor reducer (28), the drive pulley (74), the driven pulley (75) and the belt which connects said pulleys (74) (75), form a configuration of transmission means which actuate the rotation of the head (2). The person with skill in the art will see that variations of the transmission means are within the scope of the invention.

It is important to note that the transmission means must enable the free rotation of the head (2), this being necessary to be able to repair the rim. In the preferred embodiment, the drive pulley (74) comprises bearings, one of said bearings being a "freewheel" such as, for example, the one published by the company RINGSPANN® in the products thereof, wherein in said freewheel bearings, the inner and outer rings thereof rotate freely in a relative direction between them, for example in a clockwise direction, and are locked for relative movement in the opposite direction, which enables movement to be transmitted from a shaft coupled to said freewheel bearing, in this case, of the shaft of the motor reducer (28), and also enable the free rotational movement of the head (2).

In order to facilitate the coupling of the tools to the head (2), the rotation of the latter can be locked by means of locking means (4) arranged in the intermediate bedplate (14). In the embodiment shown in FIG. 5, the locking means (4) comprise a locking base (4A) coupleable to the intermediate bedplate (14) through, for example, bolts, wherein the locking base (4A) comprises a hole through which a pin (4B) is displaceable, coupleable in a removable manner in the head (2), which comprises a hole (not shown) wherein said pin (4B) is inserted. Locking means of this type are known in the state of the art, as well as the variants thereof which are within the scope of the invention.

As mentioned previously, the machine is provided with a fastening device which is formed by several embodiments of tools prepared to fasten the rim in the machine in order to carry out the repair work.

FIGS. 1, 2 and 11 to 13 show a fastening tool (6) coupleable to the head (2) and to the vertical support shaft (8). The fastening tool (6) comprises a base (6A) from which a rod (6A1) configured to be coupled to the head (2) extends. In particular, this rod (6A1) comprises a threaded portion prepared for the coupling in the threaded hole (2A1) of the head (2). A shaft (6B) which extends opposite from the rod (6A1) from the base (6A) is configured to be coupled to the vertical support shaft (8) at an end opposite from the base (6B).

In order to achieve the coupling of the shaft (6B) to the vertical support shaft (8), the latter comprises, at one connecting end opposite from the block to which it is coupleable to the upper crossbar (16), a housing wherein an introduction end (6B1) of the shaft (6B) is rotatably coupled. In the preferred embodiment, a bearing is coupled in the housing, in the inner ring of which the introduction end (6B1) of the shaft (6B) of the fastening tool (6) is introduced in a fitted manner. Therefore, with the fastening tool (6) coupled to the head (2), when lowering the vertical support shaft (8), the bearing is coupled in the shaft (6B) and this coupling between shaft (6B) and vertical support shaft (8) proceeds to be braced by coupling means (7).

In a preferred embodiment, the coupling means (7) consist of a nut which moves in a threaded portion of the introduction end (6B1) against the end of the vertical support shaft (8) generating a compression with the shaft (6B) which braces the fastening tool (6).

Figure 12:
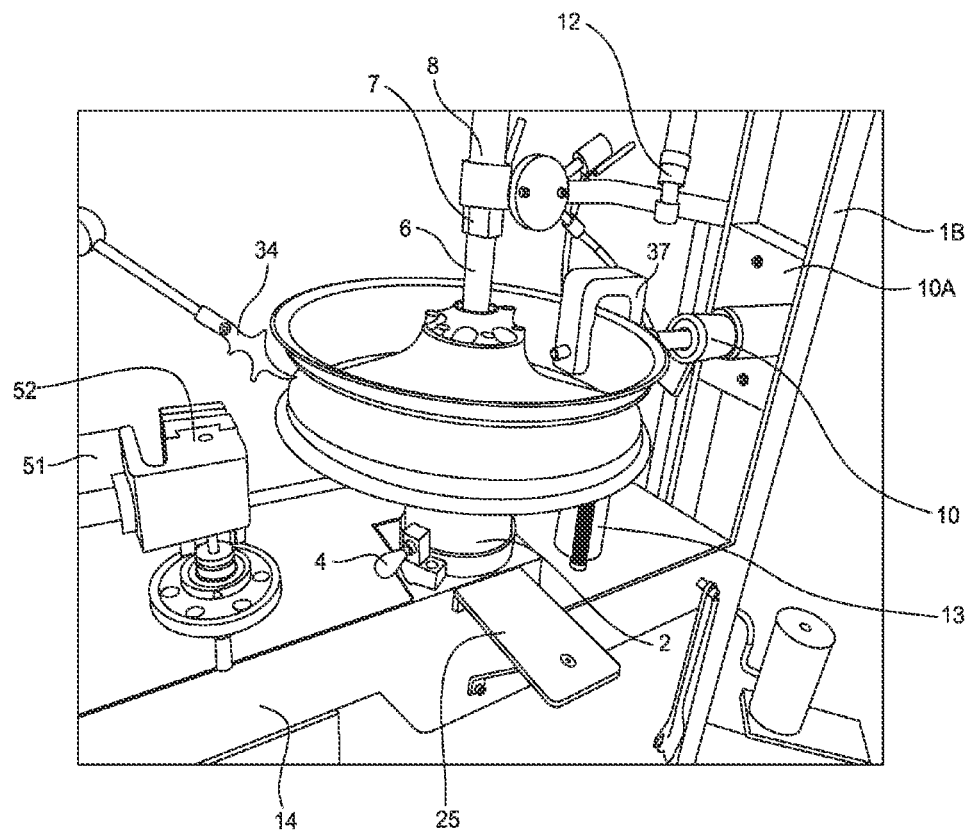
FIG. 12 is an alternate perspective view of a rim being repaired in the machine for repairing rims of the invention.
Figure 13:
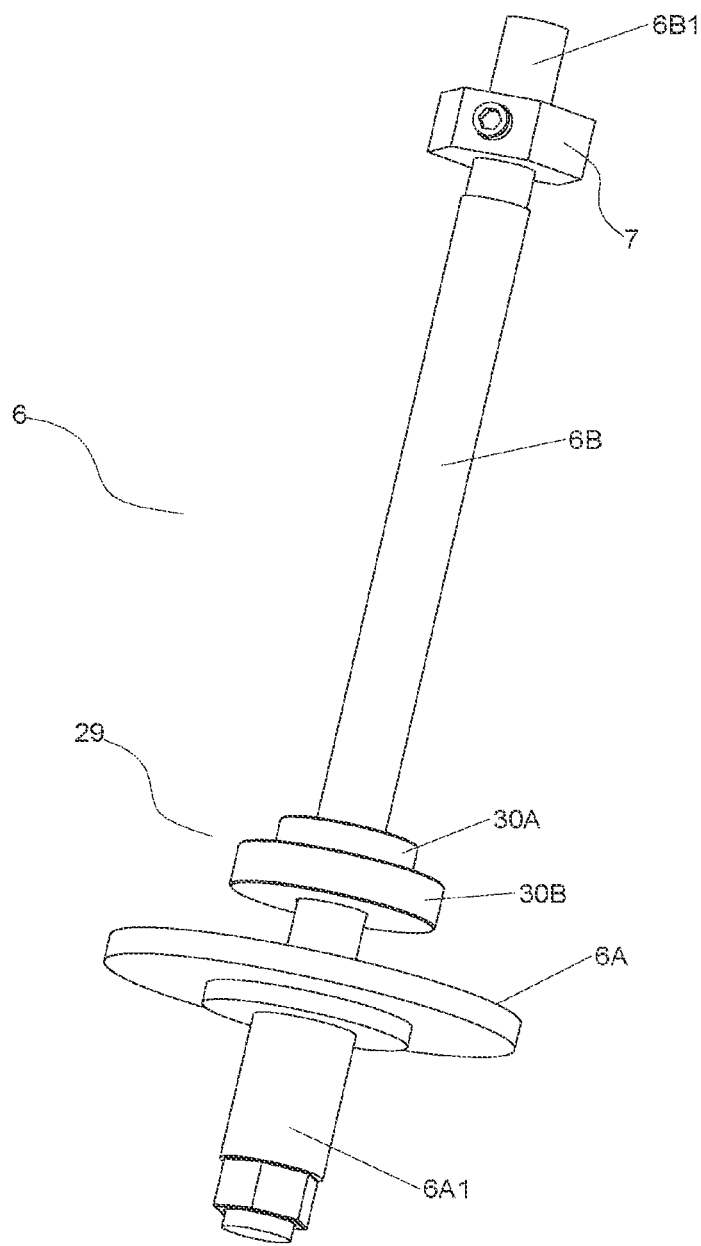
FIG. 13 is a view of the fastening tool and the adapter.

As seen in FIGS. 2 and 12, when the rim is mounted in the machine, the rim is rotatably coupled to the fastening device (6) by the hub. In particular, the shaft (6B) is coupled to the bearings of the hub of the rim.

Given the different sizes of bearings which can be incorporated in the hub of the rim and in order to be properly coupled to them, the fastening device comprises an adapter (30) coupleable to the shaft (6B) of the fastening tool (6), which comprises a first section (30A) configured to be coupled in the inner ring of the bearing of the hub and a second section (30B) configured to come into contact with a side of the inner ring of the bearing or with the hub of the rim.

When the rim rotates with measuring tools (34), the impacts and deformations of the rims are detected, both in circular rotation and in lateral warping with high precision. The rim, for the repair thereof, is manually rotated in an anti-clockwise direction. The measuring tools (34) are preferably installed in the upper crossbar (16) on a left side, as shown in FIGS. 1 to 3.

The operator works seated on a stool (21) at the suitable height so that when the rim rotates they can detect deformations and impacts with the measuring tools (34), carrying out their work without visual fatigue.

When the rim is fastened to the head (2) in the repair process and the outer edges of the rims are deformed, straightening tools can be used, in the form of spanners (22) and (23) so that the lower part of the rim is not deformed, since it can be supported on a support tool (27) which slides on a support base (25) coupled to the intermediate bedplate (14), the support tool (27) being able to place a supporting chock for the edge of the rim (26) with which the lower part of the rim does not undergo any deformation.

Different tools can be used to straighten the rim.

As seen in FIGS. 1 to 3, the machine for motorcycle repair of the invention comprises a machining device mounted in a movable manner in the vertical column (1A) of the frame (2).

The machining device comprises a mast (51) coupled to a guide support displaceable by the vertical column (1A) by a rack and pinion mechanism which is activated by a crank and which is locked in the desired point. The machining device also comprises a tool-carrying carriage (52) movable with respect to the mast (51) through a crank, and a rotating turret wherein a cutting tool (53) configured to remove material from the rim during machining is coupled.

Figure 4:
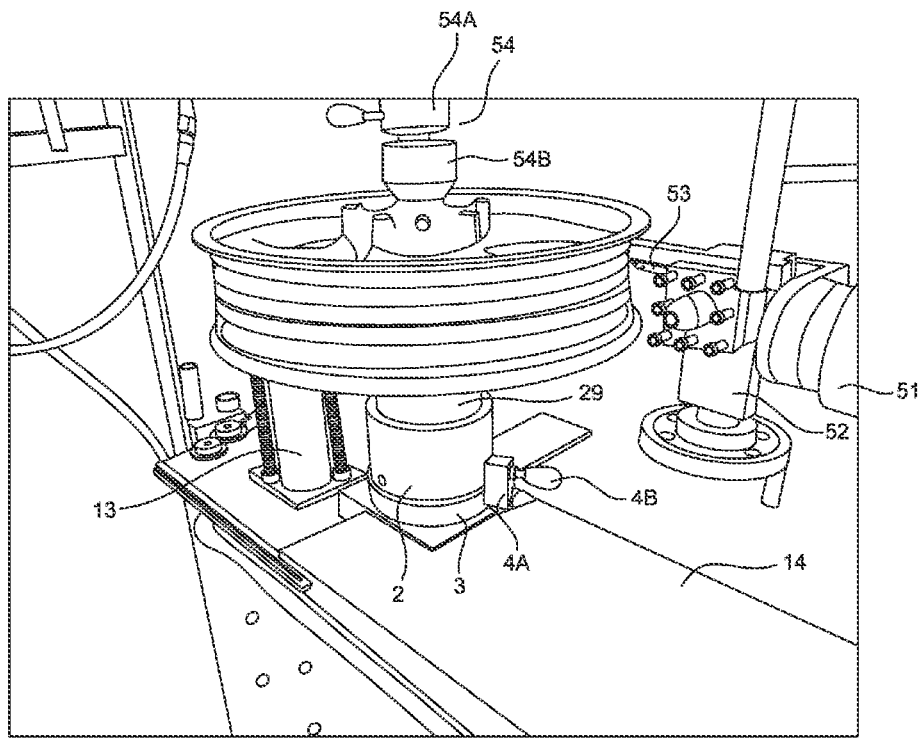
FIG. 4 is a detail view of the machine, wherein it shows a motorcycle rim coupled by the central hub to the machine with the second embodiment of the fastening device, wherein the rim is being machined by the machining device.

Moreover, as seen in FIGS. 3 and 4, the fastening device comprises a chuck (29) coupleable to the head (2) and a compression tool (54) coupleable to the vertical support shaft (8) and configured to couple the hub of the rim. The chuck (29) functions like a conventional chuck and comprises an end arranged to be coupled in the hole (2A1) of the head (2), for example, in threaded coupling.

The compression tool (54) comprises a sleeve (54A) coaxially coupleable to the vertical support shaft (8) and adjustable with respect to said vertical support shaft (8) and a pivot point (54B) coaxially coupleable to the sleeve (54A), configured to be coupled to the hub of the rim.

As seen in FIGS. 1 and 2, the connecting end of the vertical support shaft (8) is configured for the coupling of the sleeve (54A). In a preferred embodiment, the connecting end comprises an outer threaded portion to which an inner threaded portion of the sleeve (54A) is coupled. A handle (54A1) coupled to the sleeve (54A) facilitates the coupling and/or adjustment of the compression tool (54) in the vertical support shaft (8).

With respect to the pivot point (54B) coupled to the sleeve (54), this comprises a rotating conical portion intended to be housed and press on the hub of the rim. Thus, when the vertical support shaft (8) descends with the compression tool (54), the rim is fastened against the chuck (29) by the hub.

The adapter (30), coupled to the chuck (29), fits the bearing of the hub, on one side, and on the other side, the hub is fastened by applying pressure through the pivot point (54B) of the compression tool (54), as seen in FIG. 4. In this manner, the rim is locked in rotation with respect to the head (2) and, when said head (2) is actuated by the transmission means, the rim rotates, being able to be machined by the machining device.

Moreover, and as indicated at the beginning of this section, in some motorcycle rims, for example, those of the brand BMW®, the hub is fastened to a structure with an axis of rotation of the motorcycle by means of threaded bolts which cross through the hub by through holes in order to fasten the hub in said structure with an axis of rotation.

Figure 7:
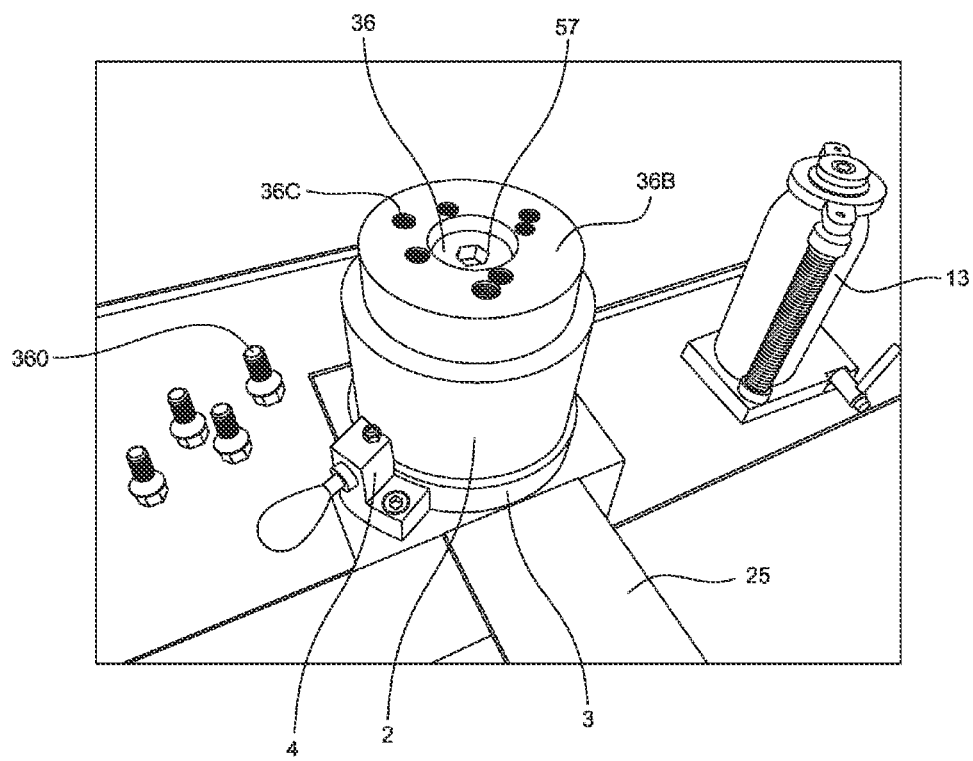
FIG. 7 is a view of a third embodiment of the fastening device.
Figure 8:
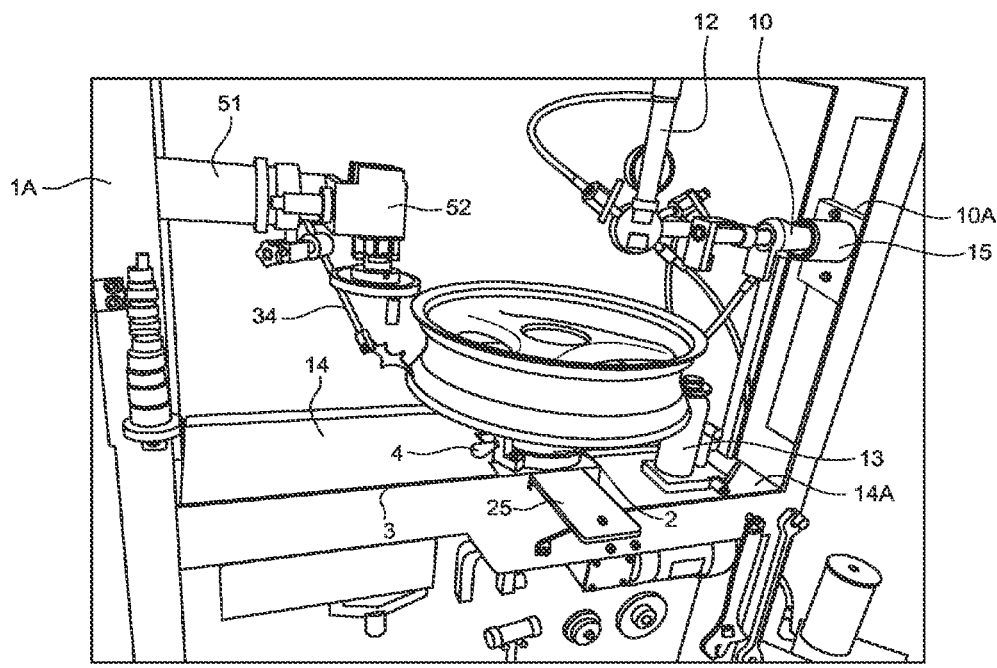
FIG. 8 is a detail view of the machine, wherein it shows a motorcycle rim coupled by the central hub to the machine with the third embodiment of the fastening device.

Consequently and, in order to couple these types of rims, as illustrated in FIGS. 7 and 8, the fastening device comprises a tool (36) coupleable to the head (2) by a fastening element (57) intended to be introduced into a hole (36A) (not shown) arranged in said tool (36) and be coupled in the hole (2A1) of the head (2). The tool (36) comprises an end (36B) wherein threaded fastening means (36C) are provided configured to couple the hub of the rim. In the preferred embodiment, the threaded fastening means (36C) are threaded holes to which fasteners (360) are coupleable in order to brace the hub of the rim against the end (36B). Alternatively, the fasteners (360) are arranged at the end (36B) and brace the hub by means of nuts or similar.

Figure 9:
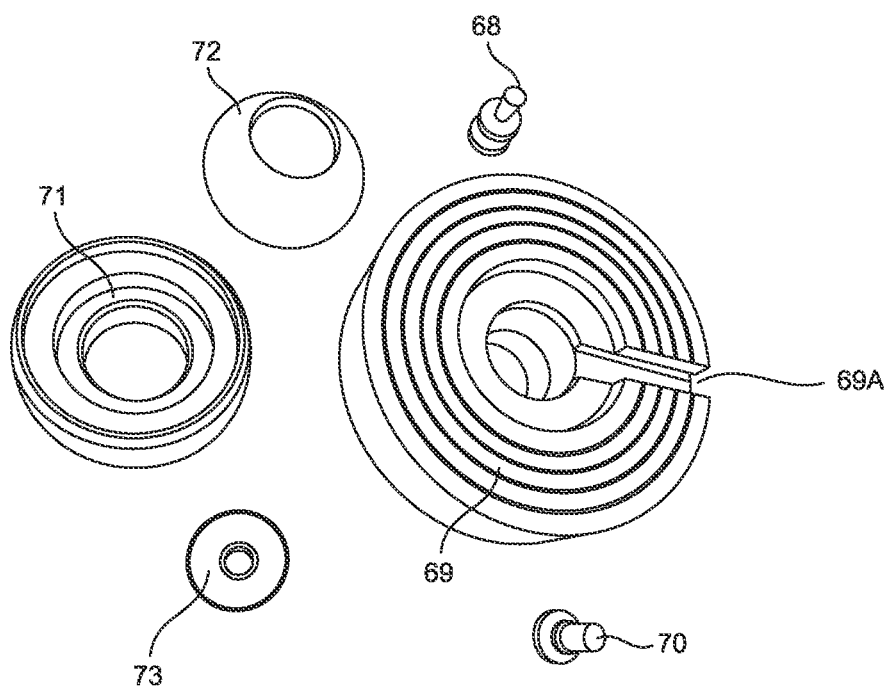
FIG. 9 is an exploded view of a fourth variant of the fastening device.
Figure 10:
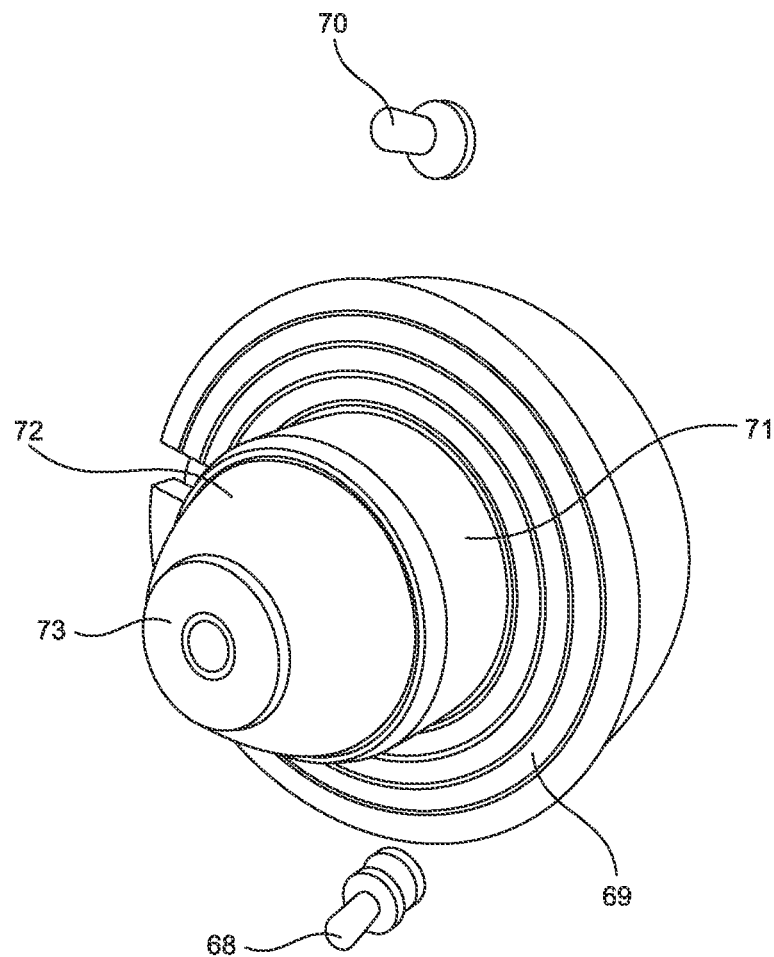
FIG. 10 is a view of the fourth variant of the fastening device.

Some motorcycle rims are wider than normal, such that the height of the head (2) is insufficient to couple these types of rims in the machine, for which reason the fastening devices include, as seen in FIGS. 9 and 10, a tool (69) coupleable to the head (2) by a fastening element (57) which is coupled in the hole (2A1) of said head (2), the tool (69) comprising a connecting area (69A) intended for the coupling of a drag pin (68).

As seen in FIG. 9, the tool (69) comprises a radial groove (69A) by which the drag pin (68) is coupleable, which, in turn, comprises a weakened area in order to guarantee the safety of the rim in the machining.

In this embodiment, the fastening device comprises an intermediate bushing (71) coaxially coupleable to the tool (69) or to the head (2) and an end bushing (72) coaxially coupleable to the intermediate bushing (71) or to the head (2), comprising a hemispherical end (72A) configured to couple the hub of the rim.

When the combination of tool (69), intermediate bushing and/or end bushing (72) is used, said end bushing (72) couples the hub on one side and on the other side the rim is fastened with the fastening tool (54). With this configuration of the fastening device, rims with a large width can be straightened and/or machined in the machine for repairing rims of the invention.

Figure 11:
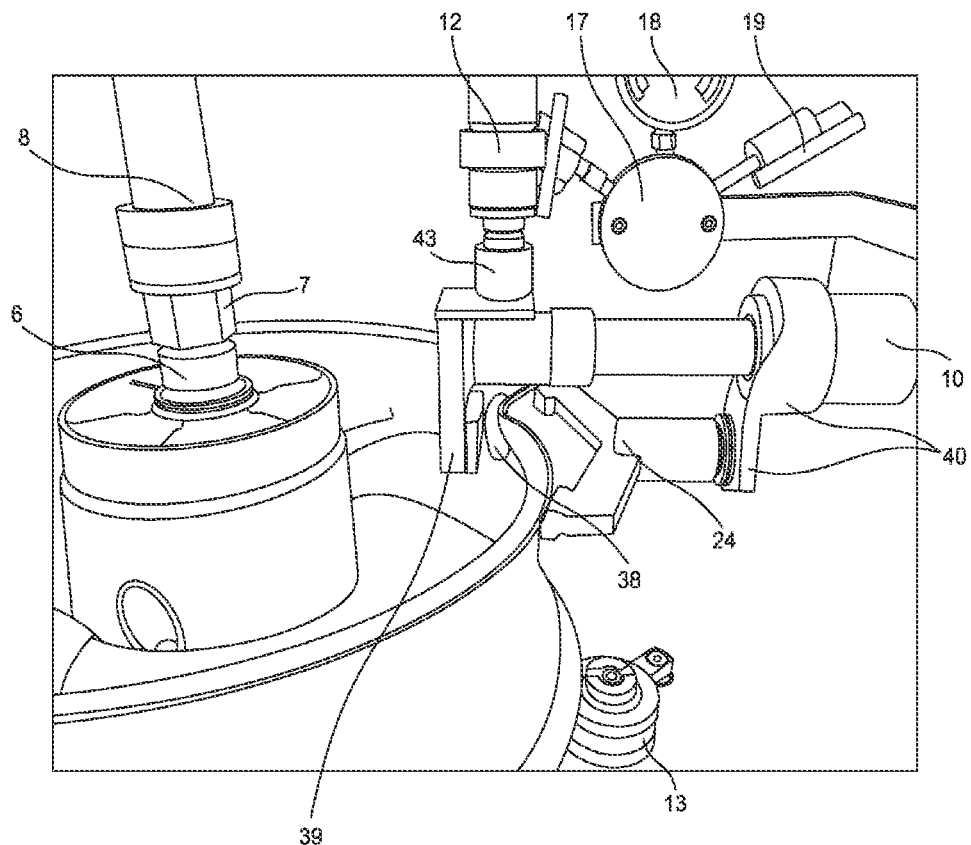
FIG. 11 is a detail view of a rim being repaired in the machine for repairing rims of the invention.

FIGS. 11 and 12 show straightening tools (24), (28), (37), (39), coupleable to the first actuator (10), which can be used to straighten the rim. The person with skill in the art will see that different tools can be used in the machine in order to repair the rims.

What is claimed is:

1. A machine for repairing motorcycle rims, the machine comprising:
    a frame provided with at least two vertical columns joined through an intermediate bedplate and an upper crossbar;
    straightening devices comprising a first actuator for lateral thrust displaceable by the vertical column for vertical thrust displaceable by the upper crossbar and a third actuator for vertical thrust displaceable in the intermediate bedplate;
    a vertical support shaft coupleable to the upper crossbar and adjustable in height with respect to it, being configured to support the rim;
    a head base coupleable to the intermediate bedplate;
    a head rotatably coupleable to the head base, configured to rotate with respect to a main axis freely or actuated by a transmission means;
    locking units provided in the intermediate bedplate, configured to lock the rotation of the head;
    a fastening device coupleable to the head, configured to, in combination with the vertical support shaft, fasten the rim crossing through and/or resting on a hub of the rim; and
    a machining device mounted in a movable manner in the vertical column of the frame, configured to machine the rim, the machining device comprising:
        a mast displaceable by the lateral column of the frame;
        a tool-carrying carriage movable with respect to the mast; and
        a cutting tool coupleable to the tool carriage, configured to remove material from the rim during machining.

2. The machine according to claim 1, wherein the head comprises:
    a coupling body configured for the coupling of tools; and
    a head rod coaxial to the coupling body, rotatably coupleable to the head base, being configured to couple an actuator element of the transmission means.

3. The machine according to claim 1, wherein each of the locking units comprises a locking base coupleable to the intermediate bedplate and a pin coupleable in a removable manner in the locking base and the head.

4. The machine according to claim 3, wherein the locking base and the head comprise a hole through which the pin is introducible.

5. The machine according to claim 1, wherein the fastening device comprises:
    a fastening tool coupleable to the head and to the vertical support shaft, said fastening tool being provided with a base from which a rod configured to be coupled to the head extends and with a shaft which extends opposite from the rod from the base, the shaft being configured to be coupled to the vertical support shaft at an end opposite from the base;
    wherein, when the rim is mounted in the machine, the rim is rotatably coupled to the shaft by the hub.

6. The machine according to claim 5, wherein the fastening device comprises an adapter coupleable to the fastening tool or to the chuck, configured to fit in the hub of the rim.

7. The machine according to claim 1, wherein the fastening device comprises:
    a chuck coupleable to the head; and
    a compression tool coupleable to the vertical support shaft and configured to couple the hub of the rim.

8. The machine according to claim 1, wherein the fastening device comprises:
    a tool coupleable to the head by a fastening element intended to be introduced into a hole arranged in said tool, wherein the tool comprises an end wherein threaded fastening means are provided.

9. The machine according to claim 1, wherein the transmission means comprises a motor reducer arranged in the intermediate bedplate, configured to transmit a rotating movement to the head.

10. The machine according to claim 9, wherein the transmission means comprises a drive pulley coupleable to an output shaft of the motor reducer, a driven pulley coupleable to the head, the drive pulley and the driven pulley being connected through a belt.

11. A machine for repairing motorcycle rims, the machine comprising:
    a frame provided with at least two vertical columns joined through an intermediate bedplate and an upper crossbar;
    straightening devices comprising a first actuator for lateral thrust displaceable by the vertical column, a second actuator for vertical thrust displaceable by the upper crossbar and a third actuator for vertical thrust displaceable in the intermediate bedplate;
    a vertical support shaft coupleable to upper crossbar and adjustable in height with respect to it, being configured to support the rim;
    a head base coupleable to the intermediate bedplate;
    a head base coupleable to the head base, configured to rotate with respect to a main axis freely or actuated by a transmission means;
    locking units provided in the intermediate bedplate, configured to lock the rotation of the head;

a fastening device coupleable to the head, configured to, in combination with the vertical support shaft, fasten the rim crossing through and/or resting on a hub of the rim; and a machining device mounted in a movable manner in the vertical column of the frame, configured to machine the rim;

wherein the fastening device comprises:
  a chuck coupleable to the head; and
  a compression tool coupleable to the vertical support shaft and configured to couple the hub of the rim;

wherein the compression tool comprises:
  a sleeve coaxially coupleable to the vertical support shaft and adjustable with respect to said vertical support shaft; and
  a pivot point coaxially coupleable to the sleeve, configured to be coupled to the hub of the rim.

12. A machine for repairing motorcycle rims, the machine comprising:
  a frame provided with at least two vertical columns joined through an intermediate bedplate and an upper crossbar;
  straightening devices comprising a first actuator for lateral thrust displaceable by the vertical column, a second actuator for vertical thrust displaceable by the upper crossbar and a third actuator for vertical thrust displaceable in the intermediate bedplate;
  vertical support shaft coupleable to the upper crossbar and adjustable in height with respect to it, being configured to support the rim;
  a head base coupleable to the intermediate bedplate;
  a head rotatably coupleable to the head base, configured to rotate with respect to a main axis freely or actuated by a transmission means;
  locking units provided in the intermediate bedplate, configured to lock the rotation of the head;
  a fastening device coupleable to the head, configured to, in combination with the vertical support shaft, fasten the rim crossing through and/or resting on a hub of the rim; and
  a matchining device mounted in a movable manner in the vertical column of the frame, configured to machine the rim;
  wherein the fastening device comprises:
    a tool coupleable to the head by a fastening element, comprising a connecting area intended for the coupling of a drag pin.

13. The machine according to claim 12, wherein the fastening device comprises an intermediate bushing coaxially coupleable to the tool or to the head.

14. The machine according to claim 12, wherein the fastening device comprises an end bushing coaxially coupleable to the intermediate bushing or to the head, comprising a hemispherical end configured to couple the hub of the rim.

15. The machine according to claim 12, wherein the transmission means comprises a motor reducer arranged in the intermediate bedplate, configured to transmit a rotating movement to the head.

16. The machine according to claim 15, wherein the transmission means comprises a drive pulley coupleable to an output shaft of the motor reducer, a driven pulley coupleable to the head, the drive pulley and the driven pulley being connected through a belt.

* * * * *